(12) United States Patent
Taomoto et al.

(10) Patent No.: US 7,147,529 B2
(45) Date of Patent: Dec. 12, 2006

(54) ELECTRON EMISSION MATERIAL, METHOD OF MANUFACTURING THE SAME, AND ELECTRON EMISSION ELEMENT INCLUDING THE SAME

(75) Inventors: Akira Taomoto, Kyoto (JP); Masahiro Deguchi, Osaka (JP); Mitsuru Hashimoto, Nara (JP); Toyokazu Ozaki, Nara (JP); Motoshi Shibata, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/102,852

(22) Filed: Apr. 11, 2005

(65) Prior Publication Data

US 2005/0184635 A1 Aug. 25, 2005

Related U.S. Application Data

(63) Continuation of application No. PCT/JP2005/000110, filed on Jan. 7, 2005.

(30) Foreign Application Priority Data

Jan. 8, 2004 (JP) .............................. 2004-002716
Jan. 29, 2004 (JP) .............................. 2004-021066

(51) Int. Cl.
*H01J 1/62* (2006.01)
*H01J 63/04* (2006.01)

(52) U.S. Cl. ............................ 445/14; 445/49; 445/50; 445/51; 313/311; 313/495; 427/77; 427/8

(58) Field of Classification Search .................. 427/77, 427/8; 313/495; 445/14, 49, 50, 51
See application file for complete search history.

(56) References Cited

U.S. PATENT DOCUMENTS

| | | | |
|---|---|---|---|
| 5,091,025 A | | 2/1992 | Murakami et al. |
| 5,139,849 A | * | 8/1992 | Takagi et al. ................ 428/143 |
| 5,352,524 A | | 10/1994 | Nagata |
| 5,949,185 A | * | 9/1999 | Janning ....................... 313/495 |
| 5,955,828 A | * | 9/1999 | Sadwick et al. ............. 313/310 |
| 6,008,569 A | | 12/1999 | Yamanobe |
| 6,106,906 A | * | 8/2000 | Matsuda et al. ............. 427/558 |
| 2005/0127814 A1 | * | 6/2005 | Deguchi et al. ............. 313/495 |

FOREIGN PATENT DOCUMENTS

JP 3-75211 3/1991

(Continued)

*Primary Examiner*—Mariceli Santiago
*Assistant Examiner*—Anthony Perry
(74) *Attorney, Agent, or Firm*—McDermott Will & Emery LLP

(57) ABSTRACT

The present invention provides an electron emission material that is excellent in electron emission characteristics, a method of manufacturing the same, as well as an electron emission element. The method is a method of manufacturing an electron emission material including a carbon material obtained by baking a polymer film. In the method, a polyamic acid solution is prepared in which at least one metallic compound selected from a metal oxide and a metal carbonate is dispersed; the polyamic acid solution thus prepared is formed into a film and then is imidized to form a polyimide film including the metallic compound; and then the polyimide film thus formed is baked to form the carbon material. The electron emission material is formed so that it includes a carbon material, a protrusion having a concavity in its surface is formed at the surface of the carbon material, and the protrusion includes a metallic element.

5 Claims, 8 Drawing Sheets

FOREIGN PATENT DOCUMENTS

| | | |
|---|---|---|
| JP | 5-170536 A | 7/1993 |
| JP | 10-188778 | 7/1998 |
| JP | 2000-44220 A | 2/2000 |
| JP | 2000-082334 A | 3/2000 |
| JP | 2000-90813 A | 3/2000 |
| JP | 2001-048509 A | 2/2001 |
| JP | 2002-274827 A | 9/2002 |
| JP | 2002-308611 A | 10/2002 |
| JP | 2003-53167 A | 2/2003 |
| JP | 2003-178669 A | 6/2003 |
| JP | 2003-223843 A | 8/2003 |
| JP | 2003-317656 A | 11/2003 |
| JP | 2004-119263 A | 4/2004 |

* cited by examiner

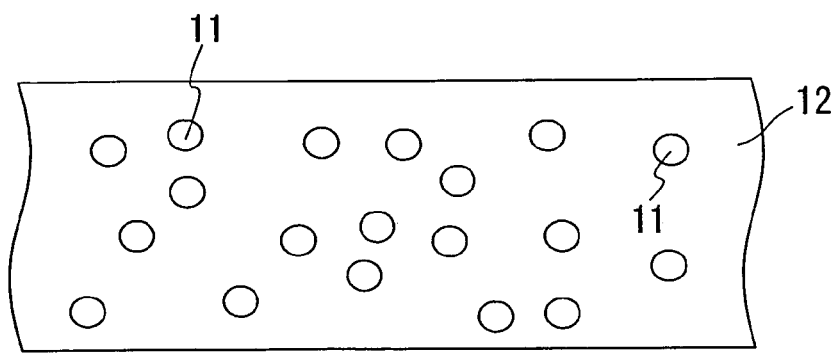
F I G. 6 A
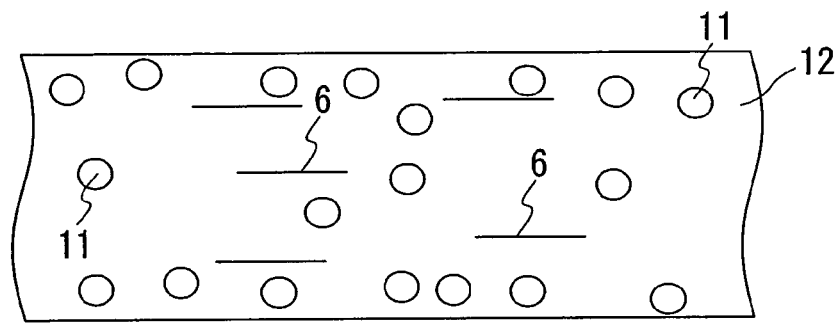
F I G. 6 B
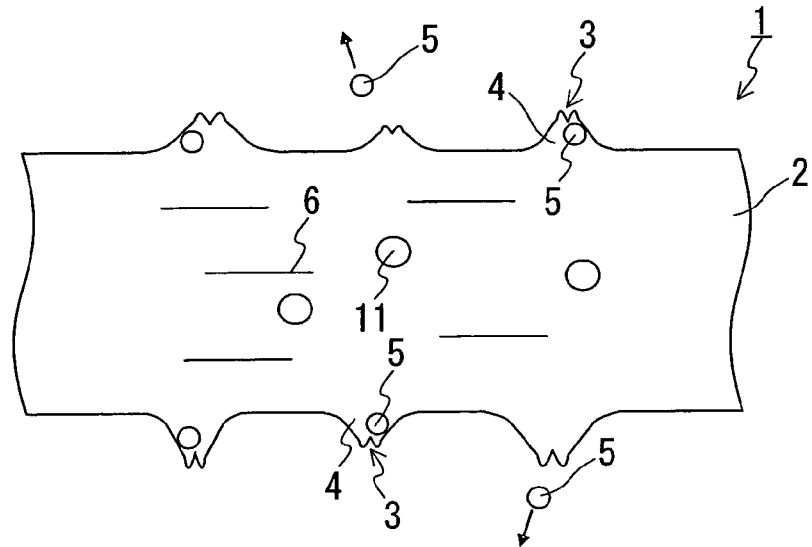
F I G. 6 C

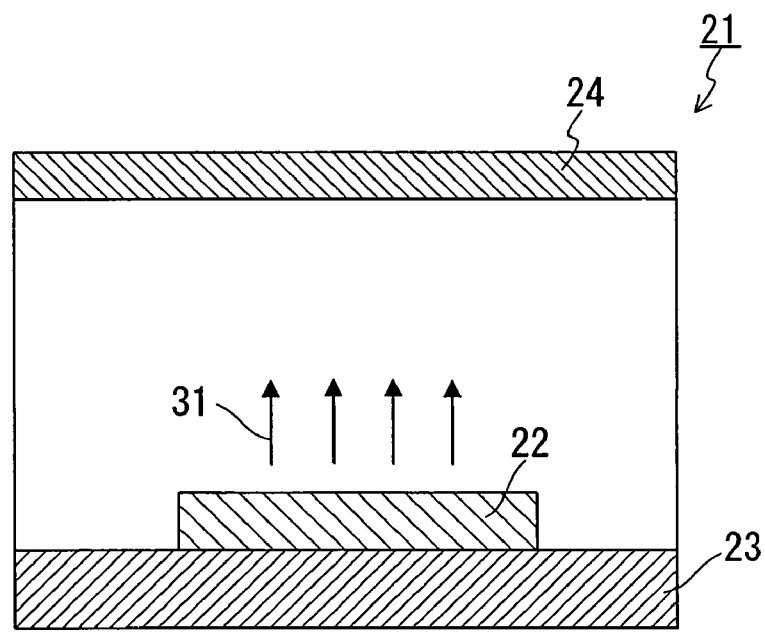
F I G. 7
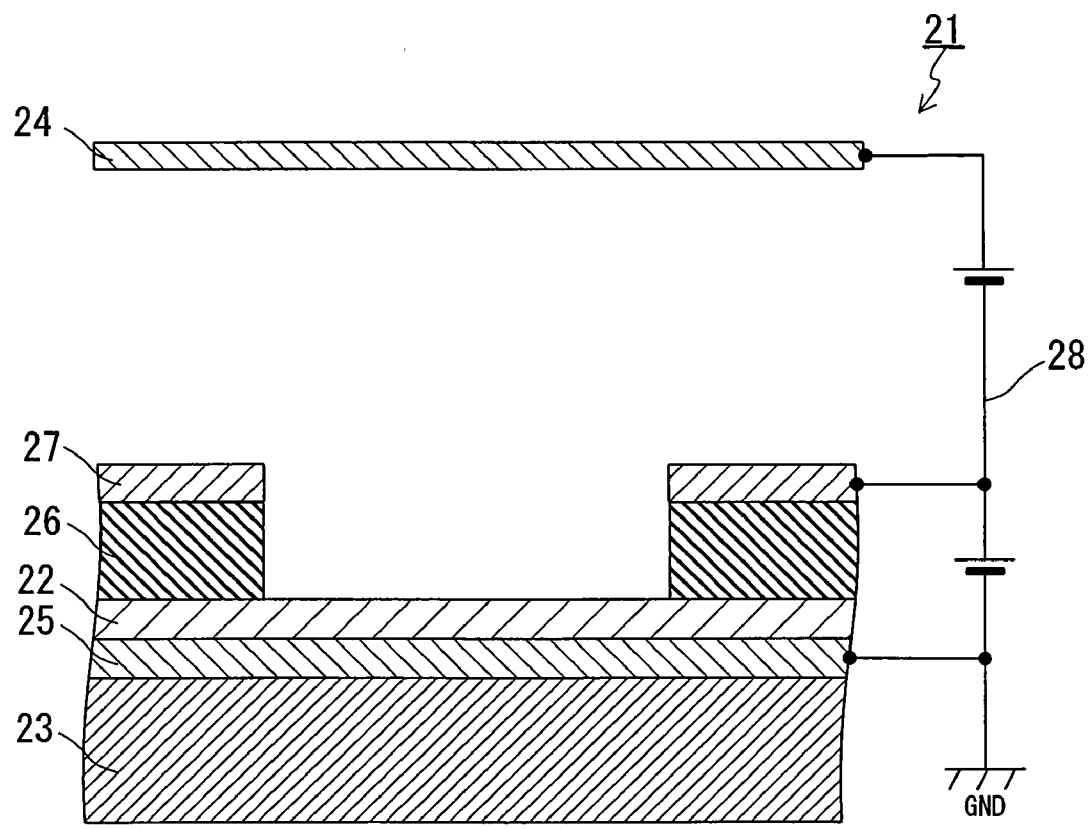
F I G. 8

ELECTRON EMISSION MATERIAL, METHOD OF MANUFACTURING THE SAME, AND ELECTRON EMISSION ELEMENT INCLUDING THE SAME

REFERENCE TO RELATED APPLICATION

This Application is a continuation of International Application No. PCT/JP2005/000110, whose international filing date is Jan. 7, 2005, which in turn claims the benefit of Japanese Application No. 2004-002716 filed on Jan. 8, 2004, and Japanese Application No. 2004-021066 filed on Jan. 29, 2004, the disclosures of which Applications are incorporated by reference herein. The benefit of the filing and priority dates of the International and Japanese Applications is respectfully requested.

BACKGROUND OF THE INVENTION

1. Field of the Invention

The present invention relates to an electron emission material including a carbon material and a method of manufacturing the same. The present invention also relates to an electron emission element including the electron emission material used therein.

2. Description of the Related Art

Materials including a carbon material such as amorphous carbon, diamond, carbon nanotube (CNT), fullerene, etc. have been developed actively as electron emission materials that are used for electron sources of various devices such as displays, etc. For instance, the CNT is excellent in electroconductivity and heat resistance. Furthermore, as described in "Carbon Nanotube, Challenge to Nanodevice, p 175–184, published by Kagaku-Dojin Publishing Company. INC (January 2001)", since the CNT has a high aspect ratio (length/diameter) and allows an electric field to be concentrated, it is excellent in electron emission characteristics. Hence, it is expected to be applied to electron sources that can be driven at a lower voltage. The CNT, however, has problems in manufacturing cost, mass-productivity, stability in the case of long-term use, etc.

On the other hand, the improvement in electron emission characteristics has been attempted not by utilizing the peculiar shape of the material as in the case of the CNT but by changing the properties of the surface of the material. For example, H10(1998)-188778A/JP discloses a technique of improving the electron emission characteristics by disposing a metallic element having a small work function on the surface of a carbon material through oxygen to change the electronic state of the surface. The carbon material disclosed in H10(1998)-188778A/JP is a particle produced by forming a carbon body using a fine particle of a metal catalyst as a nucleus and then allowing the surface of the carbon body thus formed to terminate with an alkali metal element or an alkaline earth metal element. In such a material, since the metallic fine particle has a large size and thus has a small interaction with carbon, it is difficult to change the electronic state of the carbon surface satisfactorily. Accordingly, it is difficult for the material to provide a high emission current density as an electron source.

Furthermore, for instance, 2003-53167A/JP discloses a film-like carbon material containing a metallic element (a carbon film containing a metallic element). The carbon material disclosed in 2003-53167A/JP is formed by introducing a metallic element into a solution of organic polymer, forming a polymer film, and then baking the polymer film thus formed. The metallic element to be introduced is an element that belongs to Group 8 to Group 12 (Group of the element is indicated according to the prescription of IUPAC (1989) in the present specification) such as Fe, Co, Ni, Pd, Pt, Cu, Ag, Zn, Cd, etc. The baking temperature is in the range of 500° C. to 1200° C. Such a carbon material is excellent in gas separation characteristics. However, the metallic elements of Group 8 to Group 12 conceivably do not contribute to the change in the electronic state of the carbon material surface that depends on the interaction with carbon. Accordingly, in the case of the carbon material disclosed in 2003-53167A/JP, it is difficult to improve the electron emission characteristics.

In addition, H05(1993)-170536A/JP and 2002-274827A/JP, which are documents relating to the present application, disclose techniques of adding a metallic compound to a polyamic acid. In these documents, however, the metallic compound to be added to a polyamic acid is a chloride (Lines 39 to 47, Column 20 of H05(1993)-170536A/JP) and an inorganic phosphate compound (Line 48, Column 4 to Line 8, Column 5 of 2002-274827A/JP). It is difficult for such metallic compounds to satisfactorily change the electronic state of the carbon material that depends on the interaction with carbon and thus to improve the electron emission characteristics. Furthermore, these documents refer to no electron emission material.

SUMMARY OF THE INVENTION

The method of manufacturing an electron emission material of the present invention is a method of manufacturing an electron emission material including a carbon material obtained by baking a polymer film. In the manufacturing method, a polyamic acid solution is prepared in which at least one metallic compound selected from a metal oxide and a metal carbonate is dispersed; the polyamic acid solution is formed into a film and it then is imidized to form a polyimide film including the metallic compound; and the polyimide film is baked to form the carbon material.

In the manufacturing method of the present invention, the metallic compound is preferably a compound of at least one element selected from an alkali metal element and an alkaline earth metal element, and more preferably a compound of at least one element selected from Ca, Sr, Ba, Li, Na, K, Rb, and Cs.

In the manufacturing method of the present invention, the metallic compound may be particulate. In this case, it is preferable that the metallic compound have a mean particle size in the range of 10 nm to 100 μm.

In the manufacturing method of the present invention, it is preferable that the polyimide film be baked at a temperature of 1200° C. to 3000° C.

The electron emission material of the present invention is an electron emission material including a carbon material. In the electron emission material, a protrusion having a concavity in its surface is formed at the surface of the carbon material, and the protrusion contains a metallic element.

The electron emission material of the present invention has an emission current density of at least $1 \times 10^{-4}$ A/cm$^2$, preferably at least $5 \times 10^{-4}$ A/cm$^2$, and more preferably at least $7.2 \times 10^{-4}$ A/cm$^2$.

In the electron emission material of the present invention, the protrusion has a substantially circular shape or a substantially elliptical shape when viewed from the direction perpendicular to the surface of the carbon material, and the concavity may be formed at a substantial center of the protrusion when viewed from the direction.

In the electron emission material of the present invention, it is preferable that the concavity have a depth that is less than the height of the protrusion.

In the electron emission material of the present invention, the carbon material may be a material obtained by baking a polymer film. In this case, it is preferable that the polymer film be a polyimide film.

In the electron emission material of the present invention, the metallic element is preferably at least one selected from an alkali metal element and an alkaline earth metal element, and more preferably at least one selected from Ca, Sr, Ba, Li, Na, K, Rb, and Cs.

In the electron emission material of the present invention, it is preferable that the protrusion have a mean diameter in the range of 10 nm to 200 nm when viewed from the direction perpendicular to the surface of the carbon material.

In the electron emission material of the present invention, it is preferable that the carbon material include a graphite structure.

In the electron emission material of the present invention, it is preferable that the carbon material include a void therein and the metallic element additionally be disposed on the surface of the carbon material facing the void.

The electron emission element of the present invention is an electron emission element including: an electron emission layer containing an electron emission material; and an electrode that is disposed so as to face the electron emission layer and that allows a potential difference to be generated between the electron emission layer and itself. In the electron emission element, the electron emission material includes a carbon material, a protrusion having a concavity in its surface is formed at the surface of the carbon material, and the protrusion includes a metallic element.

BRIEF DESCRIPTION OF THE DRAWINGS

FIG. 6A is a schematic view showing a step of an example of the method of manufacturing an electron emission material according to the present invention.

FIG. 6B is a schematic view showing a step of the example of the method of manufacturing an electron emission material according to the present invention.

FIG. 6C is a schematic view showing a step of the example of the method of manufacturing an electron emission material according to the present invention.

FIG. 7 is a schematic view showing an example of the electron emission element according to the present invention.

FIG. 8 is a schematic view showing another example of the electron emission element according to the present invention.

DETAILED DESCRIPTION OF THE INVENTION

Embodiments of the present invention are described below with reference to the drawings. In the following descriptions, identical members may be indicated with identical marks and the same descriptions may not be repeated.

First, the electron emission material of the present invention is described.

Figure 1:
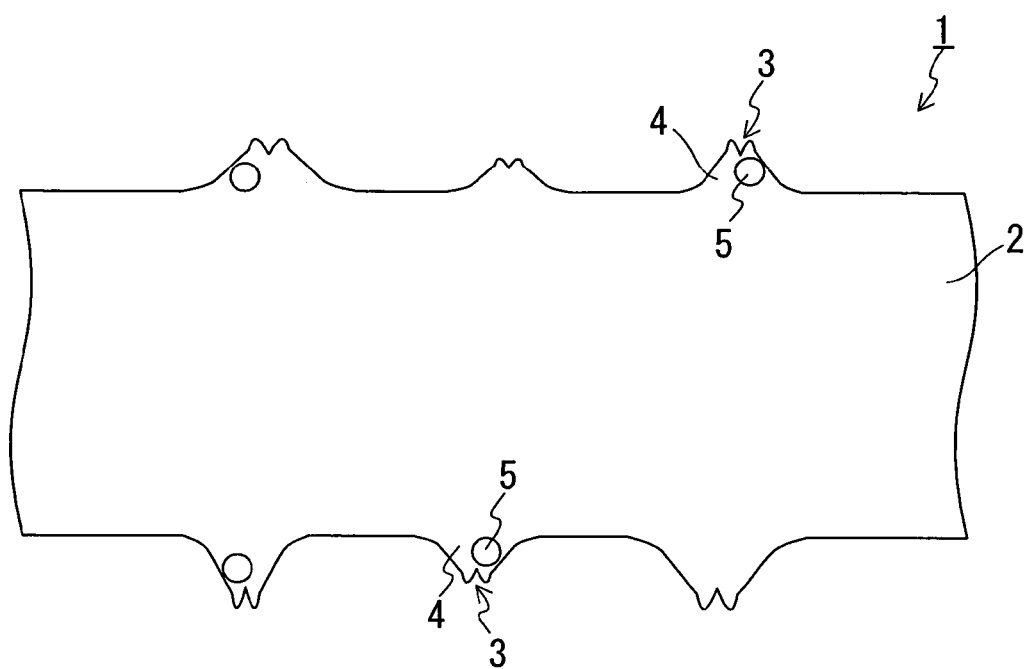
FIG. 1 is a schematic view showing an example of the electron emission material according to the present invention.

FIG. 1 shows an example of the electron emission material according to the present invention. The electron emission material 1 shown in FIG. 1 includes a film-like carbon material 2 obtained by baking a polymer film (for instance, a polyimide film). Protrusions 4 which have a concavity 3 in its surface are formed at the surface of the carbon material 2. The protrusions 4 are provided with a metallic element 5 disposed therein. It also can be said that the carbon material 2 is a carbon film having, at its surface, protrusion structures that have the metallic element 5 disposed therein and a concavity in a part thereof. The electron emission material of the present invention can be obtained by, for instance, the method of manufacturing an electron emission material of the present invention to be described later.

With such a configuration, when applied to the electron emission material 1, an electric field can be concentrated on the protrusions 4 formed at the surface of the carbon material 2. The disposition of the metallic elements 5 in the protrusions 4 that are present at the surface of the carbon material 2 allows the electronic state of the surface of the carbon material 2 to be varied efficiently. Accordingly, the electron emission material 1 can be obtained that is excellent in electron emission characteristics (for instance, that can emit electrons upon application of a lower voltage than that required conventionally and/or has an increased emission current density).

Figure 2:
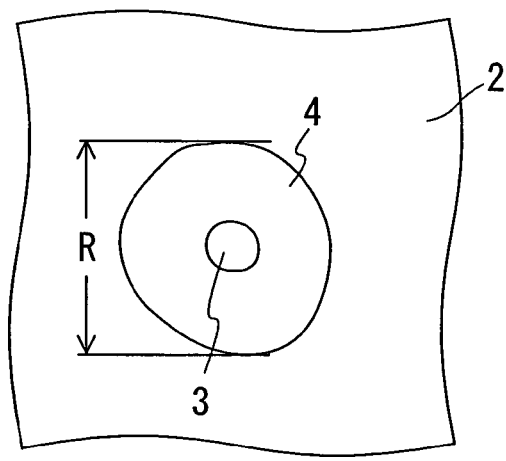
FIG. 2 is a schematic view showing the electron emission material shown in FIG. 1, which is viewed from another angle.

The shape of the protrusions 4 is not particularly limited. For instance, when viewed from the direction perpendicular to the surface of the carbon material 2, they may be of a substantially circular shape, a substantially elliptical shape, a substantially polygonal shape, an indeterminate shape, etc, but generally are of a substantially circular shape or a substantially elliptical shape. The concavity 3 may be present in any part of the surface of the protrusion 4. The number of the concavity 3 to be provided for the protrusion 4 also is not particularly limited. In the carbon material 2 shown in FIG. 1, as additionally shown in FIG. 2, protrusions 4 are formed that are of a substantially circular shape and have the concavity 3 at its substantial center (that also can be referred to as its top). In other words, it also can be said that the protrusion 4 shown in FIG. 2 is a protrusion of a substantial circular-arc shape whose part encircled by an arc is concave. FIG. 2 is a drawing of the carbon material 2 shown in FIG. 1, which is viewed from the direction perpendicular to the surface thereof.

The size of the protrusion 4 is not particularly limited. For instance, when viewed from the direction perpendicular to the surface of the carbon material 2, it may have a mean diameter (indicated with "R" in FIG. 2) in the range of 10 nm to 200 nm, preferably in the range of 10 nm to 100 nm. The shape, size, etc. of the concavity 3 provided for the protrusion 4 are not particularly limited. The depth of the concavity 3 generally is less than the height of the protrusion 4.

Preferably, the surface of the carbon material 2 includes about $10^7$ to $10^9$ pieces of protrusions 4 formed in an area of 1 $mm^2$.

Preferably, the electron emission material 1 has an emission current density of at least $1 \times 10^{-4}$ $A/cm^2$, preferably at least $5 \times 10^{-4}$ $A/cm^2$, and more preferably at least $7.2 \times 10^{-4}$ $A/cm^2$.

The type of the metallic element 5 is not particularly limited. It, however, is preferably at least one selected from an alkali metal element and an alkaline earth metal element, and more preferably at least one selected from Ca(calcium), Sr(strontium), Ba(barium), Li(lithium), Na(sodium), K(potassium), Rb(rubidium), and Cs(cesium). The disposition of such an element allows the electronic state of the surface of the carbon material 2 to be varied more efficiently and reliably.

The metallic element 5 may be disposed in any part of the protrusion 4. Furthermore, at least some of the protrusions 4 may be provided with the metallic element 5 disposed therein. The specific manner of the disposition thereof is not particularly limited. For instance, the metallic element 5 may adsorb to the carbon structure of the protrusion 4, or the carbon structure and the metallic element 5 may be bonded chemically to each other. In addition, another element such as oxygen may be present between the carbon structure and the metallic element 5. In the electron emission material of the present invention, the metallic element 5 may be disposed not only in the protrusions 4 but also inside the carbon material 2 additionally.

The amount of the metallic element 5 contained in the carbon material 2 may be, for instance, in the range of 0.01 wt. % to 10 wt. %, preferably in the range of 0.05 wt. % to 5 wt. %.

The shape of the carbon material 2 is not particularly limited. It may be a film-like carbon material (a carbon film) as shown in FIG. 1 or a particulate carbon material. Similarly in the particulate carbon material 2, an emission current density that an electron source is required to provide can be obtained certainly through the effect of concentration of the electric field to be provided by the protrusion 4 and the variation in electronic state to be caused by the disposition of the metallic element 5 in the protrusion 4. The particulate carbon material 2 can be obtained by, for instance, pulverizing the film-like carbon material 2 obtained by baking a polymer film.

Figure 3:
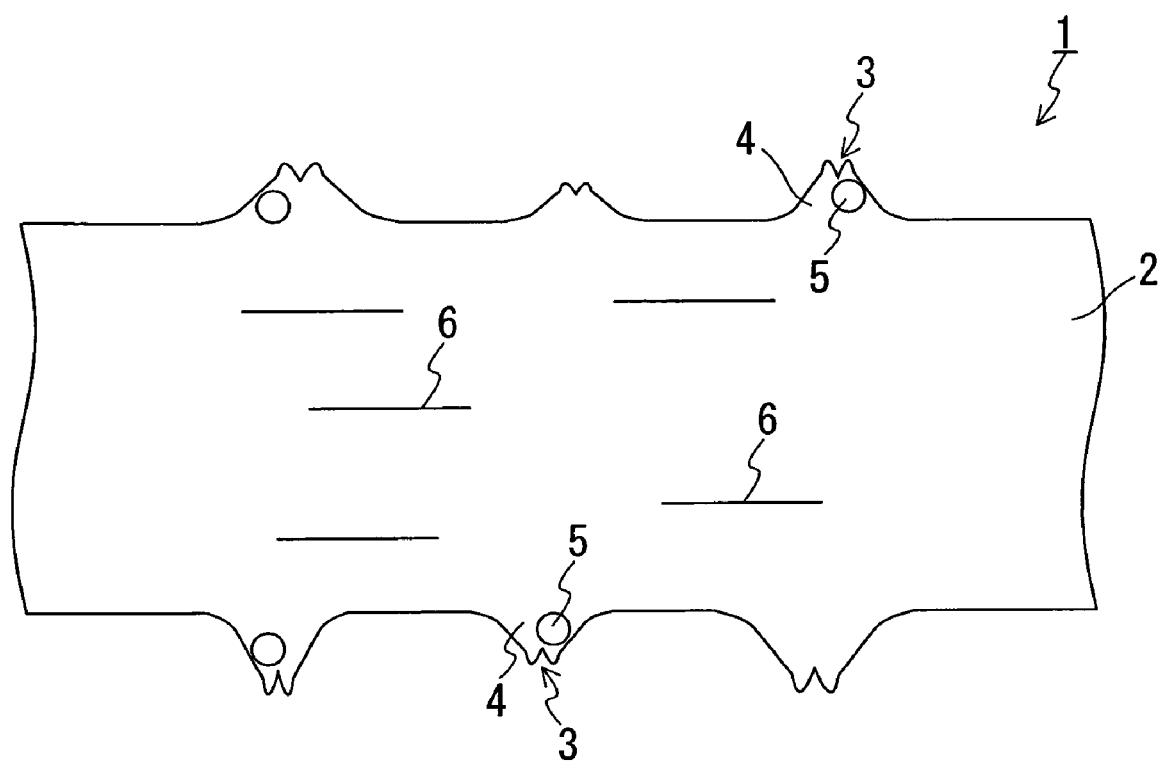
FIG. 3 is a schematic view showing another example of the electron emission material according to the present invention.

The configuration of the carbon material 2 is not particularly limited. It may be amorphous (for instance, amorphous carbon) or a carbon material 2 including crystal structures (for example, graphite structures 6 that are a type of two-dimensionally oriented structure) as shown in FIG. 3. When it includes crystal structures, the crystal structures may be present in at least a partial region of the carbon material 2. In the case of the carbon material 2 including the graphite structures 6, it may include at least two layers of graphene. The size of the crystal structures is not limited. The carbon material 2 may include crystal structures on the order of several nanometers (for instance, amorphous carbon) or those on the order of several hundred nanometers (for example, highly oriented graphite). The configuration of the carbon material 2 can be controlled by changing the temperature at which the polymer film is baked, for example.

It is preferable that the carbon material 2 include the graphite structures 6 as the crystal structures. This allows the electron emission material to have better electron emission characteristics and to be excellent in thermal conductivity and electroconductivity. The carbon material 2 shown in FIG. 3 includes the graphite structures 6 therein but may include the graphite structures 6 in the protrusions 4.

Figure 4:
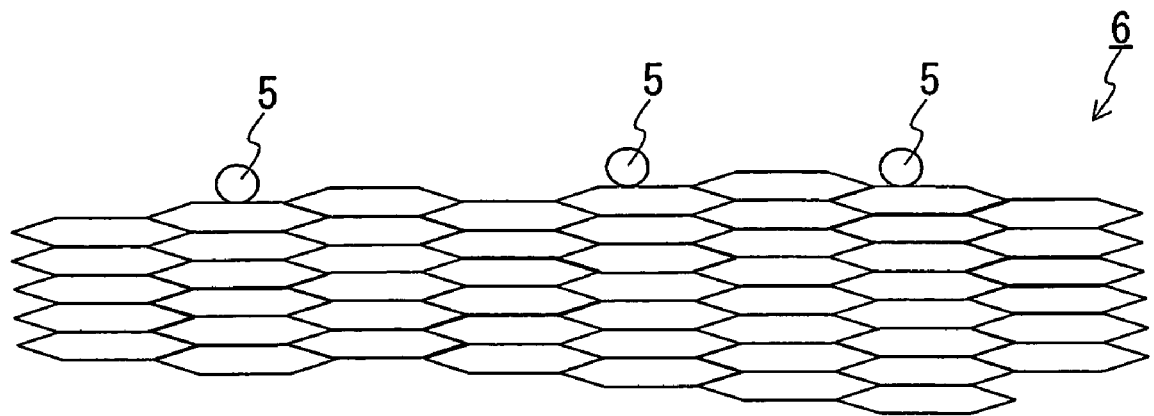
FIG. 4 is a schematic view showing still another example of the electron emission material according to the present invention.

When the carbon material 2 includes the graphite structures 6, as shown in FIG. 4, it is preferable that metallic elements 5 additionally be disposed at the periphery of graphite structure 6. In this case, the electronic state of the surface of the carbon material 2 can be varied further efficiently. Such a carbon material 2 can be formed by, for instance, controlling the temperature at which the polymer film is baked.

Figure 5:
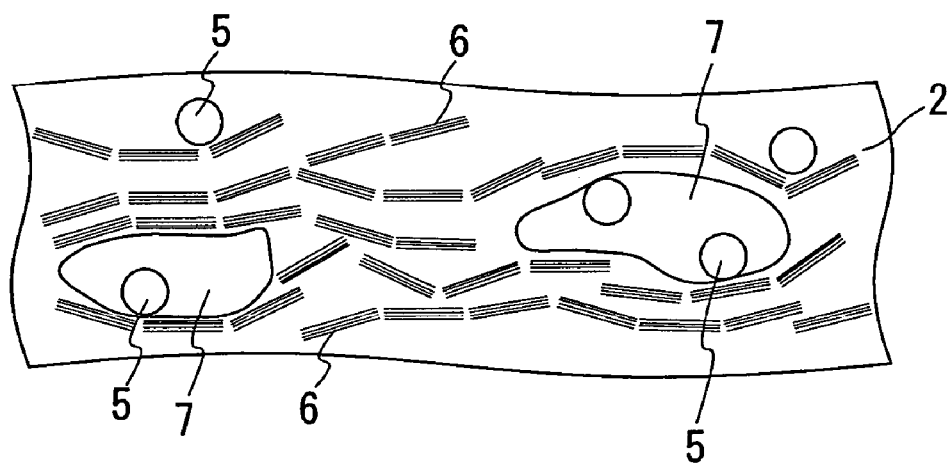
FIG. 5 is a schematic view showing yet another example of the electron emission material according to the present invention.

Preferably, the carbon material 2 includes voids 7 therein and metallic elements 5 additionally are disposed on the surfaces of the carbon material 2 facing the voids 7 as shown in FIG. 5. In this case, the electronic state of the surface of the carbon material 2 can be varied further efficiently. The voids 7 can be formed by, for instance, controlling the temperature at which the polymer film is baked.

In the case of the film-like carbon material 2, the carbon material 2 has a thickness in the range of 0.1 μm to 500 μm, for example.

Now, the description is directed to the method of manufacturing an electron emission material according to the present invention.

FIGS. 6A to 6C show an example of the method of manufacturing an electron emission material according to the present invention.

First, as shown in FIG. 6A, a polyimide film 12 is formed that contains at least one type of metallic compound 11 selected from a metal oxide and a metal carbonate.

The polyimide film 12 containing the metallic compound 11 can be formed by, for example, dispersing the metallic compound 11 in a polyamic acid solution (i.e. preparing a polyamic acid solution including the metallic compound 11 dispersed therein), forming the polyamic acid solution thus prepared into a film, and then imidizing it.

A general method can be used for the preparation of the polyamic acid solution containing the metallic compound 11 dispersed therein. In addition, a general method can be used for the method of forming the polyamic acid solution into a film and imidizing it. For instance, the polyimide film can be formed by forming a polyamic acid film from a polyamic acid solution and then heat-treating the polyamic acid film thus formed. This heat treatment can be carried out at a temperature in the range of 200° C. to 350° C. The heat treatment allows the polyamic acid to be dehydrated and polymerized and thereby to be changed into polyimide. Since the specific methods of the film formation and the heat treatment are not particularly limited, general methods can be used.

Next, the polyimide film 12 thus formed is baked. Conceivably, the following phenomena are developed in the process of baking. First, as shown in FIG. 6B, as high molecules included in the polyimide film 12 are carbonized, the metallic compound 11 diffuse inside the polyimide film 12 and then a large part thereof aggregates in the vicinity of the surface of the film. Subsequently, with the progress of baking, a part of the metallic compound 11 leaves to the outside while forming protrusions 4 at the surface of the film. Conceivably, since a large part of the metallic compound 11 present in the vicinity of the film surface are reduced through the baking, metallic elements 5 leave mainly in the state of a single substance. Thus concavities 3 are formed, in the surfaces of the protrusions 4, as traces of the metallic elements 5 (or the metallic compound 11) that have left there. On the other hand, the metallic elements 5 that have not left remain in the protrusions 4. The reason is not clear but in order to form the protrusions 4 and the concavities 3 and to improve the electron emission characteristics by the formation thereof, it is important that the metallic compound 11 is an oxide or a carbonate. Thus the electron emission material 1 of the present invention can be obtained. In this connection, as shown in FIG. 6C, a part of the metallic compound 11 may remain inside the carbon material 2 in the electron emission material 1 of the present invention.

The metallic compound 11 is preferably a compound (an oxide and/or a carbonate) of at least one element selected from an alkali metal element and an alkaline earth metal element, and more preferably a compound (an oxide and/or a carbonate) of at least one element selected from Ca, Sr, Ba, Li, Na, K, Rb, and Cs.

The shape of the metallic compound 11 is not particularly limited. It may be particulate, for instance. The average particle size of a particulate metallic compound 11 may be, for instance, in the range of 10 nm to 100 μm, more preferably in the range of 10 nm to 5 μm.

The amount of the metallic compound 11 contained in the polyimide film 12 is, for instance, in the range of 0.01 wt. % to 10 wt. %, preferably in the range of 0.05 wt. % to 5 wt. %.

The baking of the polyimide film 12 may be carried out by placing the polyimide film 12 in a furnace whose inside has been maintained at a baking temperature, for a predetermined period of time. Preferably, the baking is carried out in an inert gas (for instance, a rare gas and/or nitrogen) atmosphere.

The baking of the polyimide film 12 may be carried out at a temperature of, for instance, 1200° C. to 3000° C. When an electron emission material 1 including developed graphite structures such as highly oriented graphite is required, it is preferable that the baking be carried out at a higher temperature (for instance, 2000° C. to 3000° C.).

The baking of the polyimide film 12 may be carried out successively in at least two different temperature ranges. For instance, preliminary baking may be carried out before the baking. In that case, the carbon material 2 may be formed as follows. That is, after the preliminary baking is carried out at a temperature of 1200° C. or lower to allow the carbonization reaction and the thermal decomposition of polyimide to progress, the baking is carried out at a temperature of at least 1200° C. to reduce the metallic compound 11 and to allow the carbonization reaction to progress further.

Next, the electron emission element of the present invention is described.

An electron emission element of the present invention is provided with an electron emission layer including an electron emission material of the present invention described above and an electrode that is disposed so as to face the electron emission layer and that produces a potential difference between the electron emission layer and itself. The electron emission element of the present invention includes an electron emission material that is excellent in electron emission characteristics. Accordingly, the electron emission element can emit electrons, for instance, upon application of a lower voltage. Thus, an electron emission element can be obtained that is excellent in electron emission characteristics (for example, that is allowed to be of a lower power consumption type).

FIG. 7 shows an example of the electron emission element of the present invention. In the electron emission element 21 shown in FIG. 7, an emitter (an electron emission layer) 22 including an electron emission material of the present invention is formed on a substrate 23 and an anode 24 is disposed so as to face the emitter 22. While the space between the emitter 22 and the anode 24 is kept a vacuum atmosphere, a potential difference is produced between the emitter 22 and the anode 24, with the anode 24 being positive. Thus, electrons 31 can be emitted from the emitter 22.

FIG. 8 shows another example of the electron emission element of the present invention. In the electron emission element 21 shown in FIG. 8, an emitter (an electron emission layer) 22 including an electron emission material of the present invention is formed above a substrate 23, with a conductive layer 25 being interposed therebetween, and an anode 24 is disposed so as to face the emitter 22. In addition, a gate insulating film 26 and a gate electrode 27 are disposed on the emitter 22, and the conductive layer 25, the gate electrode 27, and the anode 24 are connected electrically to each other through a circuit 28. While the space between the emitter 22 and the anode 24 is kept a vacuum atmosphere, a voltage is applied, with the anode 24 being positive, between the emitter 22 and the anode 24 using the circuit 28. Thus, electrons can be emitted from the emitter 22. In this stage, the amount of electrons to be emitted from the emitter 22 (i.e. the emission current density) can be controlled through the control of the electrical potential of the gate electrode 27 with respect to the emitter 22. The electron emission elements shown in FIGS. 7 and 8 are elements that generally are referred to as field emission cold cathodes. The example shown in FIG. 7 and the example shown in FIG. 8 are referred to as a diode structure and a triode structure, respectively. In this manner, the electron emission material of the present invention can be used regardless of the structure of the electron emission element.

EXAMPLES

Hereinafter, the present invention is described further in detail using examples. However, the present invention is not limited to the examples described below.

In the examples, a carbon film was formed by baking a polyimide film containing a metallic compound and then the configuration of the surface of the carbon film thus formed was evaluated. Furthermore, an electron emission element was produced using the carbon film formed in the above as an electron emission material and then the emission current density obtained therefrom was evaluated.

In the examples, "Example Sample" denotes an electron emission material that has protrusions and concavities at its surface as well as improved electron emission characteristics. On the other hand, "Reference Example Sample" denotes an electron emission material that has protrusions and concavities at its surface but has not been improved in electron emission characteristics. Moreover, "Comparative Example Sample" denotes an electron emission material that has no protrusions and concavities at its surface and has not been improved in electron emission characteristics.

First, the methods of producing the respective carbon film samples that were evaluated in the examples are described.

Sample A (Reference Example Sample)

In a nitrogen gas atmosphere, 120 ml of dimethylacetamide were added to 5 g of bis(4-aminophenyl)ether, which then was stirred to be a uniform solution. Subsequently, 5.45 g of pyromellitic dianhydride further were added to the solution thus produced. This was stirred for about three hours and thereby a polyamic acid was synthesized.

Subsequently, 6.27 g of the solution containing the synthesized polyamic acid were taken, and silver nitrate ($AgNO_3$) was added thereto so as to account for 10.3 wt. % of the whole. This then was subjected to ball-milling for 12 hours and thus a polyamic acid solution was produced that contained silver nitrate dissolved therein uniformly.

Next, the polyamic acid solution thus produced was spread over a laboratory dish and a polyamic acid film including silver nitrate particles was formed. The film thus formed was dried in the air for one hour. Thereafter, the pressure of the atmosphere was reduced gradually using a vacuum pump, so that the film was in a reduced-pressure atmosphere, and thereby the removal of the solvent was promoted (10 hours in total). Subsequently, it was heat-treated in a 100° C. vacuum atmosphere for one hour using a vacuum oven. Thus, a polyamic acid film was produced.

Next, after the polyamic acid film thus produced was removed from the laboratory dish, it was fixed to a metallic frame so as not to deform. Subsequently, the polyamic acid film was heat-treated in a 300° C. air atmosphere for two hours using an oven. Thus a polyimide film was produced. Conceivably, this heat treatment allowed the polyamic acid to be dehydrated and polymerized and thereby to be imidized. The thickness of the polyimide film thus produced was measured using a micrometer and was about 50 μm. Since the color of the polyimide film had metallic luster, it is conceived that the silver nitrate changed to silver.

Next, the polyimide film thus produced was baked using an electric furnace. Specifically, first, in an argon gas atmosphere, the temperature of the polyimide film was raised to 1200° C. (at a heating rate of 3° C./minute) and then it was maintained at 1200° C. for one hour. Subsequently, it was cooled to room temperature (at a cooling rate of 5° C./minute). Thus a carbon film was obtained. Conceivably, with the baking, polyimide was decomposed thermally and thereby nitrogen, oxygen, and hydrogen left, which resulted in the formation of the carbon film.

Figure 9:
FIG. 9 is a photograph showing the configuration of the surface of Reference Example Sample, which was observed in an example.

The carbon film thus obtained had a thickness of about 45 μm. The surface of the carbon film was observed using a scanning electron microscope (SEM). As a result, as shown in FIG. 9, it was observed that a plurality of protrusions had been formed at the surface of the carbon film, and concavities were observed in many of the protrusions. The amount of silver contained in the carbon film was measured using an ICP emission spectrometry and was 0.5 wt. %. The surface of the carbon film was analyzed using an energy dispersive X-ray microanalysis (EDX). As a result, it was observed that silver had been distributed uniformly at the surface.

Sample 1 (Example Sample)

A polyimide film containing barium carbonate ($BaCO_3$) was produced in the same manner as in the case of Sample A. However, particulate barium carbonate (with a mean particle size of 30 μm) was used instead of the silver nitrate employed in Sample A. The barium carbonate was added to the solution containing polyamic acid so as to account for 3 wt. % of the whole. The polyimide film thus produced had a thickness of about 60 μm. It was observed with an optical microscope. As a result, it was observed that particles to be presumed to be barium carbonate had dispersed uniformly in the polyimide film.

Figure 10:
FIG. 10 is a photograph showing an example of the configuration of the surface of the electron emission material according to the present invention, which was observed in an example.

Next, the polyimide film thus produced was baked in the same manner as in the case of Sample A and thereby a carbon film was obtained. The carbon film thus obtained had a thickness of about 50 μm. The surface of the carbon film was observed using the SEM. As a result, it was observed that countless protrusions whose mean diameter was in the range of about 10 nm to 30 nm had been formed at the film surface. Furthermore, it was observed that many of the protrusions each had a concavity at its substantial center (see FIG. 10). The amount of barium contained in the carbon film was measured using the ICP emission spectrometry and was 0.2 wt. %. The surface of the carbon film was analyzed using the EDX. As a result, the distribution of barium was observed, which seemed to correspond to the distribution of the protrusions. Since the distribution of oxygen is not observed in the places where barium is distributed, it is conceived that barium is present in the state of a simple substance.

Sample 2 (Example Sample)

A polyimide film containing cesium oxide ($Cs_2O$) was produced in the same manner as in the case of Sample A. However, cesium oxide particles (with a mean particle size of 3 μm) were used instead of the silver nitrate employed in Sample A. The cesium oxide particles were added to the solution containing polyamic acid so as to account for 3 wt. % of the whole. The polyimide film thus produced had a thickness of about 150 μm. It was observed with the optical microscope. As a result, it was observed that cesium oxide particles had dispersed uniformly in the polyimide film.

Next, the polyimide film thus produced was baked in the same manner as in the case of Sample A and thereby a carbon film was obtained. The carbon film thus obtained had a thickness of about 120 μm. The surface of the carbon film was observed using the SEM. As a result, it was observed that countless protrusions whose mean diameter was in the range of about 50 nm to 100 nm were formed at the surface. Furthermore, a crater-like concavity was observed in the surfaces of many of the protrusions. The amount of cesium contained in the carbon film was measured using the ICP emission spectrometry and was 0.3 wt. %. The surface of the carbon film was analyzed using the EDX. As a result, the distribution of cesium was observed, which seemed to correspond to the distribution of the protrusions. Cesium was present in the state of a simple substance.

Sample B (Comparative Example Sample)

A polyimide film was produced in the same manner as in the case of Sample A using no metallic compound. The polyimide film thus produced had a thickness of about 60 μm.

Figure 11:
FIG. 11 is a photograph showing the configuration of the surface of Comparative Example Sample, which was observed in an example.

Next, the polyimide film thus produced was baked in the same manner as in the case of Sample A and thereby a carbon film (with a thickness of about 40 μm) was obtained. The surface of the carbon film was observed using the SEM. As a result, as shown in FIG. 11, pits were observed, which seemed to have been formed when elements other than carbon had been discharged as gas from the inside of the polyimide film while polyimide had been carbonized, but few protrusions were observed.

Sample C (Comparative Example Sample)

A polyimide film containing calcium hydrogenphosphate (CaHPO$_4$) was produced in the same manner as in the case of Sample A. However, powdery calcium hydrogenphosphate was used instead of the silver nitrate employed in Sample A. The calcium hydrogenphosphate was added to the solution containing polyamic acid so as to account for 0.15 wt. % of the whole. The polyimide film thus produced had a thickness of about 120 µm. It was observed with the optical microscope. As a result, it was observed that particles that were presumed to be calcium hydrogenphosphate had dispersed uniformly in the polyimide film.

Next, the polyimide film thus produced was baked in the same manner as in the case of Sample A and thereby a carbon film was obtained. The carbon film thus obtained had a thickness of about 100 µm. The surface of the carbon film was observed using the SEM. As a result, a plurality of pits were observed at the surface but no protrusions formed thereat were observed. The amount of calcium contained in the carbon film was measured using the ICP emission spectrometry but no calcium was detected.

Sample 3 (Example Sample)

A polyimide film containing barium oxide (BaO) was produced in the same manner as in the case of Sample A. However, barium oxide particles (with a mean particle size of 1 µm) were used instead of the silver nitrate employed in Sample A. The barium oxide particles were added to the solution containing polyamic acid so as to account for 1 wt. % of the whole. The polyimide film thus produced had a thickness of about 60 µm. It was observed with the optical microscope. As a result, it was observed that barium oxide particles had dispersed uniformly in the polyimide film.

Next, the polyimide film thus produced was baked using an electric furnace. Specifically, first, in an argon gas atmosphere, the temperature of the polyimide film was raised to 1200° C. (at a heating rate of 3° C./minute) and then it was maintained at 1200° C. for three hours (Preliminary Baking). Subsequently, it was cooled to room temperature (at a cooling rate of 5° C./minute). Then the weight of the carbon film thus produced was measured and was about 50 wt. % to 60 wt. % of that of the polyimide film measured before the preliminary baking. Next, in an argon gas atmosphere, the temperature of the carbon film was raised to 2800° C. (at a heating rate of 5° C./minute until it reached 1200° C. and at a heating rate of 3° C./minute thereafter) and then it was maintained at 2800° C. for two hours (Main Baking). Subsequently, it was cooled to room temperature (at a cooling rate of 10° C./minute until the temperature reached 2200° C. and at a cooling rate of 20° C./minute thereafter). Thus a carbon film was obtained.

The carbon film obtained after the main baking had a thickness of about 60 µm. The surface of the carbon film was observed using the SEM. As a result, it was observed that countless protrusions whose mean diameter was in the range of about 20 nm to 50 nm had been formed. Furthermore, it was observed that many of the protrusions each had a concavity in its surface. Subsequently, the cross section of the carbon film was observed. Thereby it was observed that graphite structures had been formed in which graphenes were folded and stacked. In addition, countless voids had been present inside the carbon film and the size of the voids was in the range of about 50 nm to 500 nm.

The amount of barium contained in the carbon film was measured using the ICP emission spectrometry after the main baking and was 0.2 wt. %. The surface of the carbon film was analyzed using the EDX after the main baking. As a result, the distribution of barium was observed, which seemed to correspond to the distribution of the protrusions. The barium was present in the state of a simple substance. The cross section of the carbon film was mapped using an Auger electron spectroscopy. Thereby the presence of barium was observed on the surfaces of the voids located inside the carbon film.

Next, the configuration of the carbon film was evaluated using an X-ray diffractometry (XRD) after the main baking. As a result, peaks that reflect the (002) plane of graphite as well as higher order peaks thereof were observed. Since the spacing between graphite structures that had been determined by the XRD was 0.3358 nm, it was proved that the similar graphite structures to those obtained when the carbon film was composed of carbon alone were formed even when the carbon film contained barium.

Sample 4 (Example Sample)

A polyimide film containing cesium carbonate (Cs$_2$CO$_3$) was produced in the same manner as in the case of Sample A. However, cesium carbonate particles (with a mean particle size of 3 µm) were used instead of the silver nitrate employed in Sample A. The cesium carbonate particles were added to the solution containing polyamic acid so as to account for 3 wt. % of the whole. The polyimide film thus produced had a thickness of about 70 µm. It was observed with the optical microscope. As a result, it was observed that cesium carbonate particles had dispersed uniformly in the polyimide film.

Next, the preliminary baking and the main baking were carried out in the same manner as in the case of Sample 3 and thereby a carbon film was obtained. The carbon film had a thickness of about 80 µm after the main baking. The surface of the carbon film was observed using the SEM after the main baking. As a result, it was observed that countless protrusions whose mean diameter was in the range of about 30 nm to 60 nm had been formed. Furthermore, it was observed that many of the protrusions each had been provided with a concavity. Subsequently, the cross section of the carbon film was observed. Thereby it was observed that graphite structures in which graphenes were folded and stacked and voids had been formed.

The amount of cesium contained in the carbon film was measured using the ICP emission spectrometry after the main baking and was 0.3 wt. %. The surface of the carbon film was analyzed using the EDX after the main baking. As a result, the distribution of cesium was observed, which seemed to correspond to the distribution of the protrusions. The cesium was present in the state of a simple substance. The cross section of the carbon film was mapped using the Auger electron spectroscopy. Thereby the presence of cesium was observed on the surfaces of the voids located inside the carbon film. The configuration of the carbon film was evaluated using the X-ray diffractometry (XRD) after the main baking and thereby the same results as in Sample 3 were obtained.

Using the respective samples prepared as described above (Example Samples 1 to 4, Reference Example Sample A, and Comparative Example Samples B to C), electron emission elements like the one shown in FIG. 7 were produced and then the electron emission characteristics thereof were evaluated.

First, each sample (the carbon film) shaped into a size of 5 mm×5 mm was disposed as an emitter 22 on a stainless steel substrate while an anode 24 formed of ITO (indium tin oxide) was disposed so as to face the emitter 22. The spacing between the emitter 22 and the anode 24 was set at 1 mm. Subsequently, the space between the emitter 22 and the anode 24 was subjected to pressure reduction to have a vacuum degree of $5\times10^{-7}$ Torr. A voltage of 3 kV (an electric field strength of 3 kV/mm; with potential being positive on the anode 24 side) then was applied between the emitter 22 and the anode 24 and thereby the emission current density was measured. The results of the measurement of the emission current density are shown in Table 1 below.

TABLE 1

| Sample | Metallic Compound contained in Polyimide Film | Metallic Element contained in Carbon Film after Baking | Amount of Metallic Element contained in Carbon Film after Baking (wt. %) | Emission Current Density (A/cm$^2$) |
|---|---|---|---|---|
| 1 | BaCO$_3$ | Ba | 0.2 | $7.2 \times 10^{-4}$ |
| 2 | Cs$_2$O | Cs | 0.3 | $8.4 \times 10^{-4}$ |
| 3 | BaO | Ba | 0.3 | $7.2 \times 10^{-4}$ |
| 4 | Cs$_2$CO$_3$ | Cs | 0.2 | $8.4 \times 10^{-4}$ |
| A (R.E.) | AgNO$_3$ | Ag | 0.5 | $6.2 \times 10^{-5}$ |
| B (C.E.) | — | — | — | $5 \times 10^{-5}$ |
| C (C.E.) | CaHPO$_4$ | Not Detected | Not Detected | $5 \times 10^{-5}$ |

* R.E. denotes Reference Example, while C.E. denotes Comparative Example.

As shown in Table 1, as compared to the electron emission elements formed using Samples A to C that are Reference Example and Comparative Examples, the electron emission elements formed using Example Samples 1 to 4 had improved emission current densities.

The same results were obtained in the case where besides Cs and Ba, an oxide or a carbonate of at least one element selected from Ca, Sr, Rb, Ca, K, Na, and Li was used as the metallic compound.

The same results also were obtained when the mean particle size of the metallic compound particles was varied in the range of 10 nm to 100 μm.

As described above, the present invention can provide an electron emission material that is excellent in electron emission characteristics and a method of manufacturing the same. Furthermore, the present invention can provide an electron emission element having better electron emission characteristics than those of conventional one. The electron emission element of the present invention is not particularly limited. It is applicable to various electron devices such as, for example, displays such as an FED (a field emission display), cathode ray tubes, emitters, light sources, electron guns, etc.

Conventionally, with respect to the electron emission element, the development of a spindt-type electron emission element in which high melting metal such as silicon, molybdenum, etc. is used has been progressing. The electron emission material of the present invention can be used instead of such high melting metal.

The present invention is applicable to other embodiments as long as they do not depart from the intention and essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. A method of manufacturing an electron emission material including a carbon material obtained by baking a polymer film, the method comprising:
   preparing a polyamic acid solution in which at least one metallic compound selected from a metal oxide and a metal carbonate is dispersed;
   forming the polyamic acid solution into a film and then imidizing it to form a polyimide film including the metallic compound; and
   baking and thermally decomposing the polyimide film with letting nitrogen, oxygen and hydrogen leave from the polyimide film to form a carbon film,
   wherein the polyimide film is baked at a temperature of 1200° C. to 3000° C.

2. The method of manufacturing an electron emission material according to claim 1, wherein the metallic compound is a compound of at least one element selected from an alkali metal element and an alkaline earth metal element.

3. The method of manufacturing an electron emission material according to claim 2, wherein the metallic compound is a compound of at least one element selected from the group consisting of Ca, Sr, Ba, Li, Na, K, Rb, and Cs.

4. The method of manufacturing an electron emission material according to claim 1, wherein the metallic compound is particulate.

5. The method of manufacturing an electron emission material according to claim 4, wherein the metallic compound has a mean particle size in a range of 10 nm to 100 μm.

* * * * *